(12) United States Patent
Szenger et al.

(10) Patent No.: US 6,922,905 B2
(45) Date of Patent: Aug. 2, 2005

(54) PROBE HEAD FOR A COORDINATE MEASURING APPARATUS

(75) Inventors: Franz Szenger, Königsbronn (DE); Walter Jenisch, Heidenheim (DE); Hans-Jörg Furtwängler, Aalen (DE); Kurt Brenner, Satteldorf (DE); Thomas Maier, Essingen (DE); Horst Stacklies, Aalen (DE)

(73) Assignee: Carl-Zeiss-Stiftung, Heidenheim (DE)

( * ) Notice: Subject to any disclaimer, the term of this patent is extended or adjusted under 35 U.S.C. 154(b) by 0 days.

(21) Appl. No.: 10/612,909

(22) Filed: Jul. 7, 2003

(65) Prior Publication Data

US 2004/0128848 A1 Jul. 8, 2004

Related U.S. Application Data

(63) Continuation of application No. PCT/EP01/15120, filed on Dec. 20, 2001.

(30) Foreign Application Priority Data

Jan. 5, 2001 (DE) .......................................... 101 00 350

(51) Int. Cl.[7] .............................................. G01B 5/00
(52) U.S. Cl. ...................................................... 33/561
(58) Field of Search .......................... 33/556, 557, 558, 33/559, 560, 561; 73/866.5; 188/165, 161, 162, 163, 164, 43

(56) References Cited

U.S. PATENT DOCUMENTS

| | | | | |
|---|---|---|---|---|
| 1,790,202 A | * | 1/1931 | Down | .......................... 188/165 |
| 2,558,594 A | * | 6/1951 | Tritle | .......................... 188/161 |
| 3,044,593 A | * | 7/1962 | Scarrott et al. | ............. 188/161 |
| 3,704,770 A | * | 12/1972 | Spencer | ....................... 188/164 |
| 4,253,240 A | * | 3/1981 | Feichtinger | ................... 33/558 |
| 4,637,119 A | * | 1/1987 | Schneider et al. | ............. 33/561 |
| 4,827,782 A | * | 5/1989 | Torii et al. | ................... 188/161 |
| 5,623,766 A | | 4/1997 | Ruck et al. | |
| 5,739,610 A | * | 4/1998 | Nemoto et al. | ............. 188/158 |
| 6,314,800 B1 | * | 11/2001 | Nishimura | .................... 33/558 |
| 6,527,091 B2 | * | 3/2003 | Klode | .......................... 188/164 |
| 2004/0040800 A1 | * | 3/2004 | Anastas et al. | ............. 188/161 |
| 2004/0074715 A1 | * | 4/2004 | Johansson et al. | .......... 188/161 |
| 2004/0099492 A1 | * | 5/2004 | Onuki et al. | ................. 188/163 |

FOREIGN PATENT DOCUMENTS

| | | |
|---|---|---|
| DE | 31 06 031 | 12/1981 |
| EP | 0 531 917 | 3/1993 |

* cited by examiner

Primary Examiner—Christopher W. Fulton
Assistant Examiner—Travis Reis
(74) Attorney, Agent, or Firm—Walter Ottesen

(57) ABSTRACT

The invention is directed to a probe for coordinate measuring apparatus. The apparatus includes measuring systems (15, 16, 17) for measuring the deviation of the flexible part (10) of the probe and a damping device damps the flexible part (10) of the probe. The damping device is embodied as at least one friction brake (19, 27) and the friction force of the friction brake is adjustable. The flexible part (10) of the probe can also be blocked by the friction brake (19, 27).

14 Claims, 5 Drawing Sheets

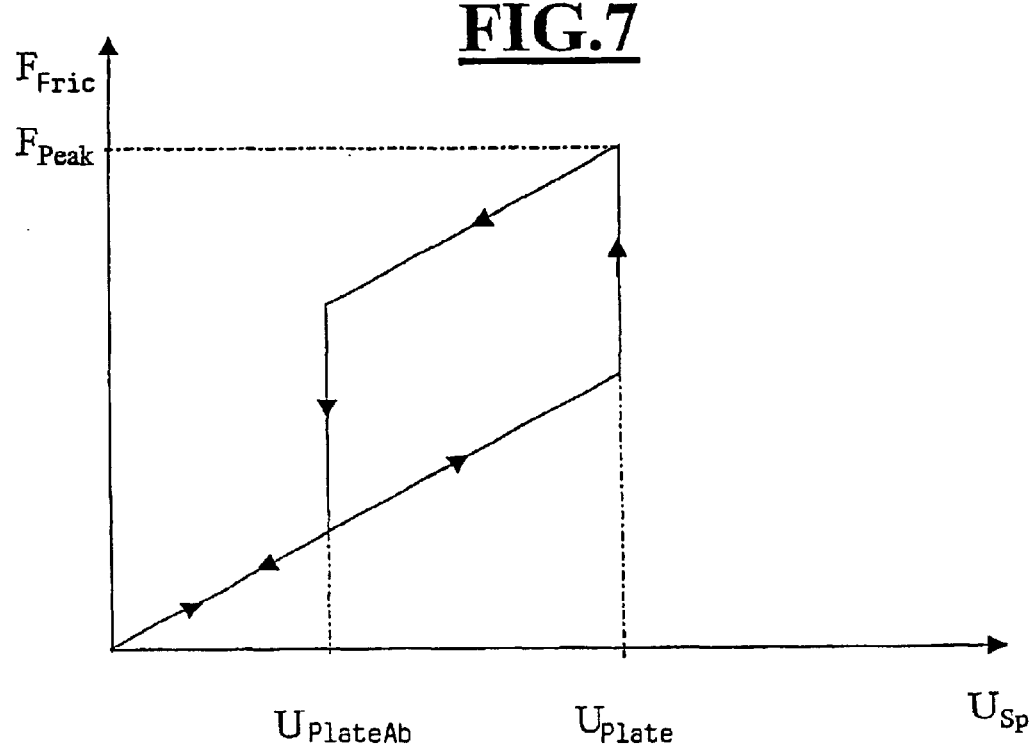
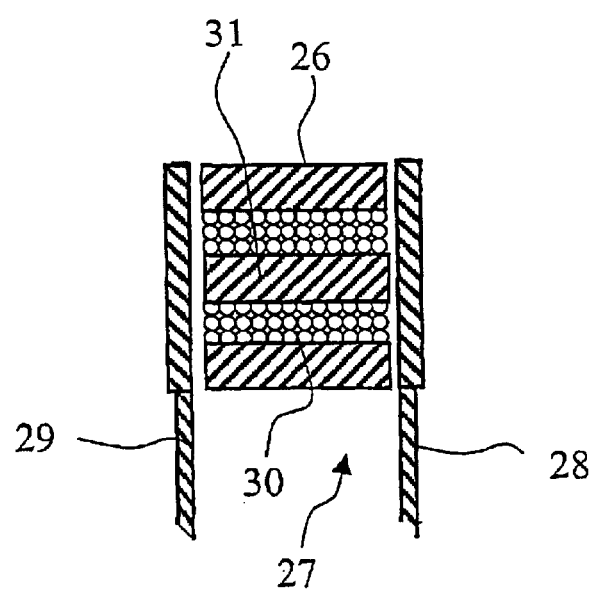

PROBE HEAD FOR A COORDINATE MEASURING APPARATUS

RELATED APPLICATION

This application is a continuation application of International patent application no. PCT/EP01/15120, filed Dec. 20, 2001, and claiming priority from German patent application 101 00 350.1, filed Jan. 5, 2001.

FIELD OF THE INVENTION

The invention relates to a probe head for a coordinate measuring apparatus having measuring systems for measuring the deflection of the flexible part of the probe head on which the probe pin is attached and the coordinate measuring apparatus also having a damping device for damping the movement of the yielding part of the probe head.

BACKGROUND OF THE INVENTION

A probe head of the kind referred to above is disclosed in U.S. Pat. No. 5,623,766. Here, a measuring probe head is described whose probe pin can be deflected in three coordinate directions (x, y, z). For this purpose, the probe head includes three spring parallelograms connected one behind the other. The probe pin is supported so as to be displaceable by each spring parallelogram in one coordinate direction. For detecting the deflection, a measuring system in the form of a plunge coil magnet is assigned to each spring parallelogram. In addition, a measuring force generator is assigned to each spring parallelogram which measuring force generator is provided in the form of a plunge coil drive and via which forces can be applied to the probe pin in the particular coordinate direction. The drive of the measuring force generators can take place via a suitable control circuit so that the probe pin can be charged with a measuring force in desired directions and/or can be clamped in desired directions and/or can be damped in desired directions.

Even though this is a good solution, it has been shown that relatively large quantities of heat occur with the use of the probe head described therein caused by the plunge coils which, in turn, acts disadvantageously on the measuring accuracy.

SUMMARY OF THE INVENTION

Starting from the above, it is an object of the invention to provide a probe head of the kind described above with which the damping of the flexible part of the probe head and therefore of the probe pin is possible with only a slight development of heat.

The probe head of the invention is for a coordinate measuring apparatus and includes: a yielding part; measuring systems for measuring the deflection of the yielding part in respective directions; a damping device for damping the yielding part in a pregiven direction; and, the damping device including at least one friction brake for generating a friction force which can be electrically changed.

The basic idea of the invention is that a friction brake is used as a damping device whose friction force can be electrically adjusted.

In this way, high friction forces can be generated via relatively low electric currents so that an effective damping can be realized in this way.

The friction brake can be so built up that a flag is clamped between two jaws in a manner similar to a shoe brake in a bicycle. The pads are drawn toward each other via an electric linear drive, for example, in the form of a plunge coil drive. The friction brake advantageously includes an electromagnet and a flag coacting therewith which is drawn magnetically against the electromagnet to generate the friction force. For this purpose, the flag has to be made of a magnetic material, preferably, a soft-magnetic material. The friction force between the flag and the electromagnet changes proportionally to the current flowing through the coil of the electromagnet so that relatively simply defined friction forces can be adjusted between the flag and the electromagnet. Since the flags need to execute only very small movements, a very dynamic change of the damping is hereby possible.

In an alternate embodiment, the friction brake can include two flags coacting with the electromagnet. These flags are mounted on both sides of the electromagnet. In this way, for the same current, a doubling of the friction force can be achieved. This affords the advantage that relatively high friction forces and therefore high damping can be realized at relatively low voltages.

The friction force of the friction brake is here usually adjusted by an electronic controller assigned to the probe head. This electronic controller preferably includes a microprocessor and can, for example, be an electronic component assembly in the probe head or even a component of the control of the coordinate measuring apparatus on which the probe head is mounted.

The friction brake can be especially advantageously operated in that one differentiates the signal of the measuring systems for measuring the deflection of the flexible part with respect to time and adjusts the friction force of the friction brake in proportion thereto. In this way, a friction force proportional to speed results between the flag and the electromagnet so that a liquid or fluid damping can be simulated thereby.

In an advantageous embodiment with an electromagnet, a coil current is derived from the time differentiated signal of the measuring systems and this coil current is supplied to the electromagnet. This coil current is proportional to the differentiated signal.

A relatively narrow gap is present between the flag or flags and the electromagnet in the rest position of the friction brake. So that friction conditions, which are reproducible with small damping, exist between the particular flag and the electromagnet, this gap would have to be manufactured to be constant with all friction brakes which, however, would mean a relatively high adjustment complexity. In order to minimize this adjustment complexity, the coil for generating low damping can be charged with an alternating current. For this reason, the particular flag starts to swing and touches the electromagnet always only during relatively short time intervals. In this way, defined friction forces are obtained and this over a relatively wide tolerance range of the distance between the particular flag and the electromagnet.

In an especially preferred embodiment, the damping arrangement can also be used additionally as a clamping device.

In the simplest case, in the first embodiment with only one flag, the coil current can be increased so far until the force is reached which is needed for clamping. Even though this is in principle possible, this solution has the distinction that a relatively intense development of heat takes place because of a large coil current and this heat development leads to measuring inaccuracies in the probe head.

In order to realize for this first embodiment of the friction brake having only one flag a clamping, which operates already at a relatively low coil current, a plate can be additionally provided on the side of the flag facing away from the electromagnet. This plate is likewise drawn magnetically by the electromagnet and is therefore made of a magnetic material, preferably, a soft-magnetic material. While the flag preferably has only a very slight thickness and can therefore be pulled against the electromagnet with relatively low forces, the plate should have a relatively large thickness relative thereto. The plate should likewise be resiliently attached and in such a manner that the plate is only then drawn by the electromagnet when the electromagnet exceeds a defined coil current. Because of the relatively large thickness of the plate, a relatively large magnetic flux can flow therethrough so that the pull force is a multiple greater than the pull force which the electromagnet can apply to the flag. If the plate is drawn to the side of the flag facing away from the electromagnet, then the probe pin is clamped thereby in the corresponding direction.

The just-described relatively high friction forces, which are required for clamping, can also be especially advantageously alternatively generated with the above-described second embodiment of the friction brake wherein a flag is mounted on both sides of the electromagnet. Here, the friction brake necessary for clamping is achieved exclusively by the pulling of the two flags. Since a flag is drawn on both sides of the electromagnet, a significantly higher friction force is obtained with the same coil current compared to the embodiment having only one flag. Compared to the first embodiment, this embodiment has furthermore the advantage that the characteristic line is linear and exhibits no hysteresis effects which are caused by the docking of the plate. Furthermore, the flags, compared to the plate, exhibit only a very slight spacing to the electromagnet. For this reason, the friction force and therefore the damping can be changed with high dynamics.

Advantageously, at least one flag can furthermore be reinforced in the region of the electromagnet in order to thereby increase the magnetic flux.

With the clamping devices known previously, it was always a problem to clamp the probe pin in a defined desired position for measuring the probe pin deflection, for example, at the zero point of the measuring system. This is now no longer a problem with a clamping in accordance with this advantageous embodiment. For this purpose, the electronic controller can at first clamp the flexible part of the probe head, to which the probe pin is attached, in any desired position by means of the friction brake. Thereafter, the electronic controller causes the measuring force generator to generate measuring forces in a pulse-like manner so that these measuring forces like hammer blows displace the movable part in the direction of the desired position, that is, for example, the zero point of the deflection system. The measuring force generator is assigned to the particular friction brake. When the desired position is reached, then the probe pin is clamped in the predefined desired position.

Furthermore, a rebounding of the probe pin can likewise be countered with the clamp device. This functions in such a manner that the electronic controller clamps the yielding part of the probe pin for a short time via the friction brake precisely when the workpiece is contacted. The contact time point can be determined from the signals of the measuring systems of the probe head.

The guides for guiding the yielding part can be different. For example, the guides can be spring parallelograms or can be rotatable joints or linear guides.

The measuring systems for measuring the deflection of the yielding part can also be different. Incremental graduations can be provided which can be read out by a read head. However, plunge coils can also be provided.

It is understood that the friction brake of the invention can also be utilized with probe heads wherein the measuring force is generated not via measurement force generators but via springs which are tensioned during a deflection of the probe pin from its rest position. Only the above-described method for clamping the probe pin in a predefined desired position cannot be carried out with this method. On the other hand, this method is not perforce necessary since the probe pin need not necessarily be clamped in a fixed predefined position. Rather, the exact deflection of the probe pin can be determined via the measuring systems for measuring the probe pin deflection and can be considered in the evaluation of the measurement data.

With the above probe heads (wherein the measuring force is generated by springs), the friction brake can also be used in order to hold the probe pin in its rest position during acceleration operations of the probe head by the coordinate measuring apparatus. Because of the inertia of the mass of the probe pin, the probe pin tends to be deflected out of its rest position opposite to the acceleration direction during acceleration operations of the probe pin. This can be prevented in that a suitable damping is adjusted or the probe pin is clamped in the particular direction when acceleration operations are present. This procedure can be used also with probe heads having measurement force generators.

BRIEF DESCRIPTION OF THE DRAWINGS

The invention will now be described with reference to the drawings wherein:

FIG. 7 is a diagram which shows the friction force ($F_{fric}$) plotted as a function of the electric voltage ($U_{sp}$) which is applied to the electromagnet with this plot being for the friction brake of FIGS. 3 to 5;

FIG. 8 is a schematic showing a friction brake according to a second embodiment of the invention with two flags mounted on respective sides of the electromagnet; and, FIG. 9 is a graph showing the friction force ($F_{fric}$) plotted against the voltage ($U_{sp}$) applied to the electromagnet with the graph being for the friction brake of FIG. 8.

DESCRIPTION OF THE PREFERRED EMBODIMENTS OF THE INVENTION

Figure 1:
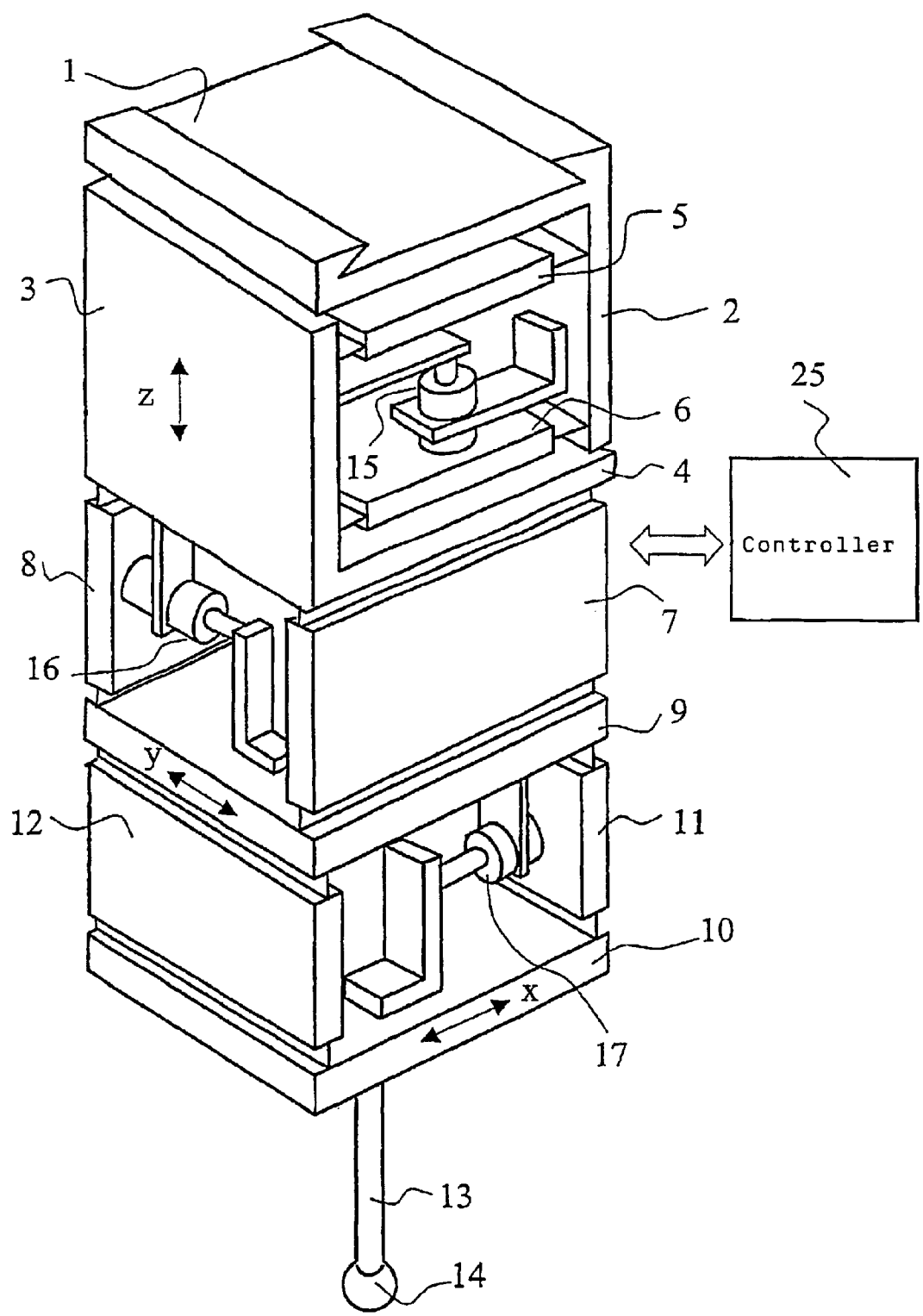
FIG. 1 is a perspective schematic of a measuring probe head.

The probe head shown in FIG. 1 has a housing-fixed part in the form of an angle whose upper horizontal leg 1 has a dove tail slot for the attachment of the probe head to the spindle of the coordinate measuring apparatus (not shown). The vertical part 3 of a further L-shaped angle is connected to the vertical leg 2 of the housing-fixed part via a pair of resilient sheet metal pieces 5 and 6 reinforced in the center. The resulting parallelogram guide defines the z-guide of the probe head.

A plate 9 is movably suspended on the horizontal part 4 of the angle, which is movable in the z-direction, via a pair of reinforced resilient sheet metal pieces 7 and 8. The plate 9 forms the y-guide of the probe head. A third pair of resilient sheet metal pieces 11 and 12 is rotated by 90° relative to the sheet metal pieces 7 and 8 and, in turn, suspended from the plate 9. The third pair of resilient sheet metal pieces 11 and 12 connects the plate 9 to a further plate 10 which defines the x-guide of the probe head. The plate 10 of the probe head yields hereby in the coordinate directions (x, y, z) and carries the probe pin 13 having probe ball 14. Each of the three parallelogram guides is provided with a measuring force generator 18 in the form of a plunge coil drive which, however, is not shown in FIG. 1. Also shown are the three measuring system (15, 16, 17) with which the deflection of the guided part of the probe head is continuously determined in the three above-mentioned coordinate direction (x, y, z). These are so-called LVDT systems which are induction coils operated essentially at a carrier frequency which output a path signal proportional to the position of the core displaceable therein. Furthermore, each of the three parallelogram guides has a friction brake with which the above-mentioned guides can be either damped or can be clamped.

Figure 2:
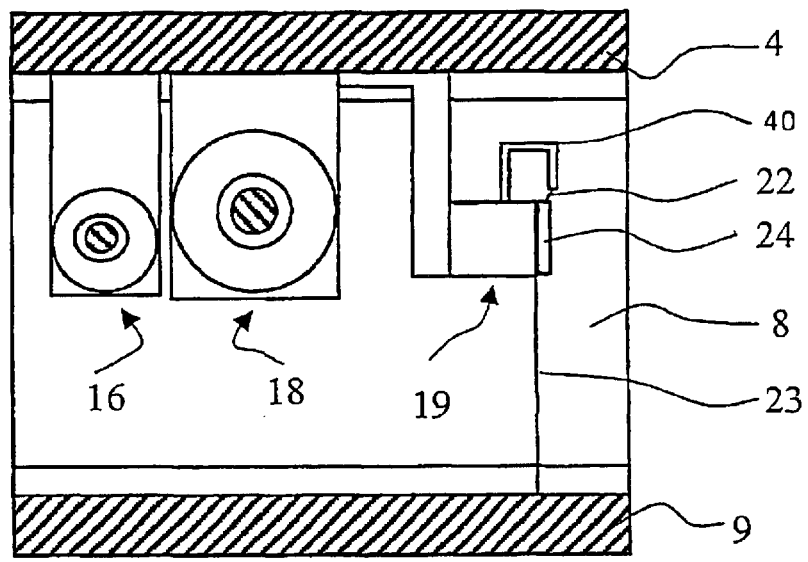
FIG. 2 shows a single spring parallelogram of the probe head of FIG. 1 in section with a friction brake in accordance with the invention.

The friction brakes 19 are also not shown in FIG. 1. Accordingly, reference is made to FIG. 2 for a more detailed explanation of the particular components. FIG. 2 shows, in section, selectively the y-guide of the probe head shown in FIG. 1. As shown in FIG. 2, the measuring system 16 described above is disposed on the left side of the y-guide. The measuring system 16 measures the deflection in the direction perpendicular to the plane of the drawing. Reference numeral 18 identifies a measuring force generator with which a measuring force can be superposed between the parts 4 and 9 in the direction perpendicular to the plane of the drawing. The measuring force generator 18 is configured in the form of a plunge coil drive.

Figures 3, 4:
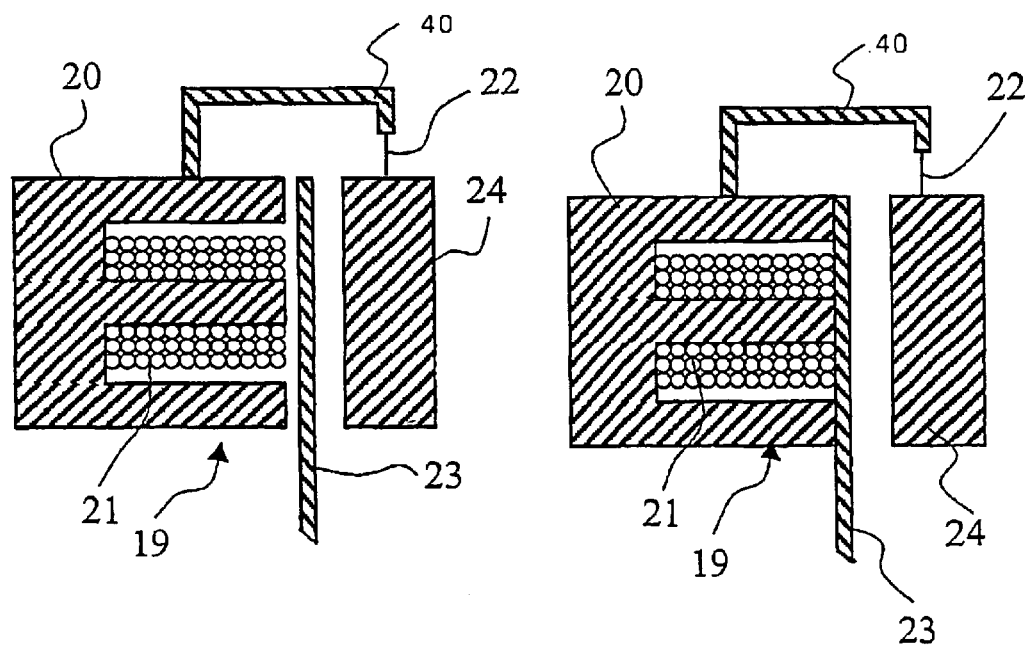
FIG. 3 shows the friction brake in the rest position.
FIG. 4 shows the friction brake of FIG. 3 with a drawn in flag.
Figure 5:
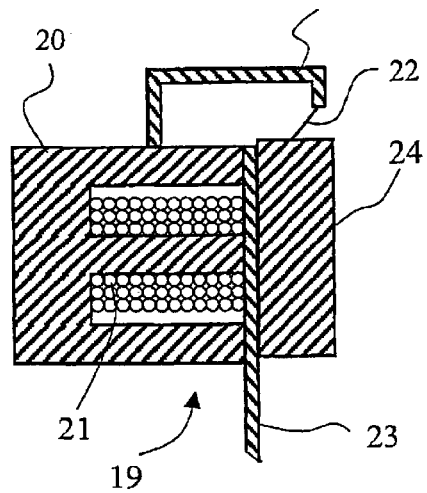
FIG. 5 is a schematic of the friction brake of FIG. 3 with a pulled flag and a pulled plate.

Furthermore, the y-guide also includes a friction brake 19 with which the y-guide can be damped and also clamped in the direction perpendicular to the plane of the drawing as explained in detail with respect to FIGS. 3, 4 and 5.

The recordation of the measurement values of the three measuring systems (15, 16, 17) for measuring the deflection of the movable part 10 and therefore of the probe pin 13 as well as the drive of the three measuring force generators 18 and the three friction brakes 19 takes place via the electronic controller 25 shown schematically in FIG. 1. The electronic controller here is a microprocessor-controlled electronic component assembly in the control of the coordinate measuring apparatus.

FIG. 3 shows, in section, a first embodiment of a friction brake 19 according to the invention. As shown in FIG. 3, the core piece of the friction brake is an electromagnet configured to have a pot shape. The electromagnet includes a flux-conducting part 20 made of soft magnetic material and a coil 21 which surrounds the inner part of the flux-conducting part 20. At the open end of the electromagnet, a flag 23 is provided which has a defined spacing to the flux-conducting part 20 of the electromagnet. Additionally, a rigid holder 40 is attached to the electromagnet. A plate 24 is attached via a leaf spring 22 to the other end of the holder 40. The plate 24 has a considerably greater thickness than the flag 23. For damping of the movement in the y-direction (that is, of the yielding part 9 relative to the part 4 in the direction perpendicular to the plane of the drawing), a defined current can be superposed on the coil 21. In this way, a magnetic pulling force arises between the ends of the flux-conducting part 20 and the ferromagnetic flag 23. This pulling force pulls the flag 23 against the ends of the flux-conducting part 20 as shown in FIG. 4. In this way, a defined friction force $F_{fric}$ is generated which can be changed over a wide range by varying the coil current.

In an advantageous embodiment, a fluid damping is, however, simulated with a Newtonian friction. This is possible in that a speed-proportional damping is realized, that is, in that the coil current and therefore the friction force $F_{fric}$ between the flag 23 and the flux-conducting part 20 is selected proportional to the speed in the particular direction. The signal for the coil current can be determined via a simple time derivative of the deflection signal of the measuring system 16. The derivative can take place either digitally or even analog in that the signal is differentiated across a capacitor.

As explained above, the gap between the flag 23 and the flux-conducting part 20 can be adjusted precisely only with great difficulty so that for each new probe head, the damping for small coil currents would have to be first determined. Furthermore, depending upon the dimensioning of the coil, it is also possible that as a consequence of the residual magnetization of the flux-conducting part 20 and the flag 23, the flag 23 remains adhered to the electromagnet even when the coil current is switched off. In order to be able to deal with this problem, the coil 21 can be charged with an alternating current so that the flag 23 lies against the flux-conducting part 20 only from time to time in correspondence to the coil currents. In this way, very slight damping is realized which is substantially constant over a larger range of the distance between the flag 23 and the ends of the flux-conducting part 20.

The friction brake 19 can additionally be used for clamping the y-guide. Here, the coil current is so greatly increased until also the plate 24 is pulled by the electromagnet against the flux-conducting part 20 as shown in FIG. 5. The thickness of the plate 24 is considerably greater than the thickness of the flag 23. For this reason, a considerably greater flux results through the plate 24 and therefore also a considerably higher force results in the direction toward the electromagnet. The flag 23 is clamped so greatly between the flux-conducting part 20 and the plate 24 because of the considerably greater force action and, in this way, the friction force $F_{fric}$ is so greatly increased that the guide in the y-direction is clamped thereby.

Above, the coil current was discussed in detail which is impressed into the coil. The development of heat of the coil is only very slight. For this reason, however, one can assume that the alternating current resistance of the coil remains approximately constant so that the coil current is always approximately proportional to the applied voltage. In this way, the friction force between the flag 23 and the flux-conducting part 20 can be viewed as also being proportional to the voltage $U_{SP}$ applied to the coil.

Figure 6:
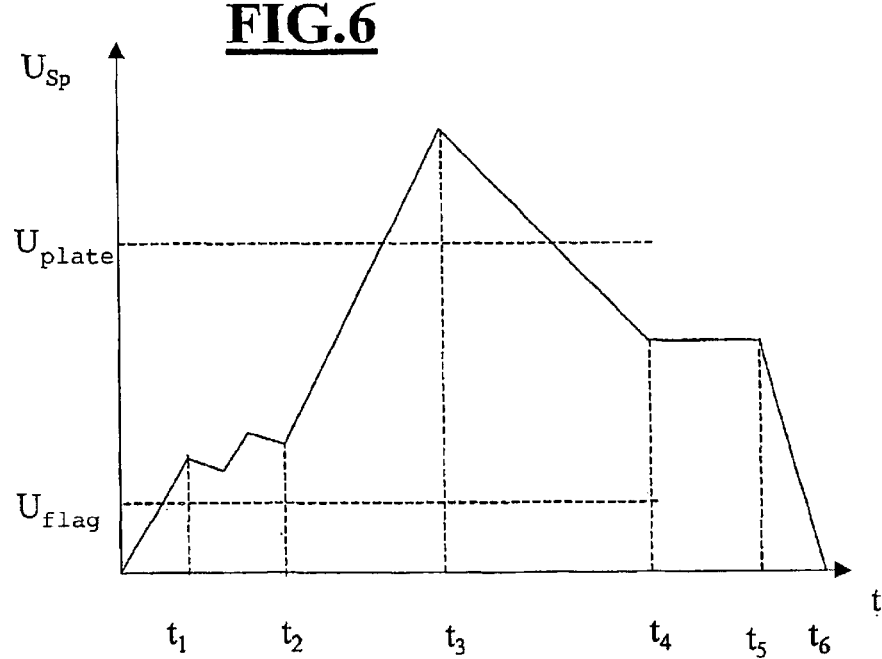
FIG. 6 is a diagram of the electric voltage ($U_{SP}$) for explaining the damping and clamping operations with the electric voltage ($U_{SP}$) being applied to the electromagnet of the friction brake of FIGS. 3 to 5.

The voltage trace during the application of the friction brake 19 for damping and for clamping the y-guide is intended to be strictly exemplary in a diagram wherein the coil voltage $U_{SP}$ is plotted as a function of time (t) (see FIG. 6).

First, the coil voltage $U_{sp}$ is increased up to time point t1 until the voltage $U_{flag}$ is exceeded. From this voltage on, the ferromagnetic flag is pulled to the ends of the flux-conducting part 20. After the time point t1, the friction force between the flag 23 and the flux-conducting part 20 is changed because of different varying of the voltage up to time point t2 in order to greatly dampen the part and therewith the probe pin 13 with different intensity. Hereafter, a clamping of the y-guide is to be undertaken. For this purpose, the voltage $U_{SP}$ is increased up to time point t3 until the voltage $U_{plate}$ is exceeded. The voltage $U_{plate}$ characterizes that voltage threshold after which the plate 24 is pulled by the flux-conducting part 20. After the plate 24 is drawn by the flux-conducting part 20 and, therefore, the flag 23 is clamped, the voltage $U_{SP}$ can immediately be lowered as can be seen at time point t4. The clamping can be varied with respect to its intensity by the voltage $U_{SP}$ shown between the time point t4 up to time point t5. In order to again release the clamping, the voltage is switched off at time point t6 so that the plate 24 as well as the flag 23 separate from the ends of the flux-conducting part 20.

In FIG. 7, a schematic diagram is shown for the described friction brake wherein the characteristic line of the voltage $U_{sp}$ impressed upon the coil is plotted against the generated friction force $F_{fric}$. The arrows show the course of the curve. Starting from the coordinate origin of the diagram, the friction force $F_{fric}$ increases approximately proportional to the voltage $U_{SP}$ up to the voltage $U_{plate}$. Starting with this voltage, and as already described, the plate 24 is additionally drawn so that the friction force increases abruptly to the value $F_{peak}$. If now the voltage $U_{SP}$ again drops, then the friction force $F_{fric}$ is likewise again less but at a higher level. Starting with the voltage $U_{plateab}$, the holding force of the coil 21 becomes so slight that the plate 24 is pulled back from the electromagnet into its original position by a leaf spring 22 so that the friction force $F_{fric}$ then drops abruptly. For a further drop of the voltage $U_{SP}$ in the direction of the coordinate origin, the curve again moves on the original curve.

In contrast, FIG. 8 shows a second embodiment of a friction brake 27 according to the invention. In this embodiment, an electromagnet is likewise provided which includes flux-conducting parts (26, 31) and a coil 30. Furthermore, two flags 28 and 29 are provided which are mounted on both sides of the electromagnet so that they establish the magnetic flux between the poles of the magnetic coil on both sides. The flags can therewith be simultaneously drawn. The flags are furthermore somewhat strengthened in the area of the electromagnet compared to the flag 23 of the first embodiment in order to achieve a greater cross section for the flux already at low voltages. The special feature of this second embodiment is that even for relatively low voltages ($U_{SP}$) without hysteresis effect of the plate 24, relatively high friction forces $F_{fric}$ and therefore a high damping can be realized which is adequate also for clamping the guide. In this way, it is also possible to change the damping very dynamically because the flags have to execute only very small movements.

Figure 9:
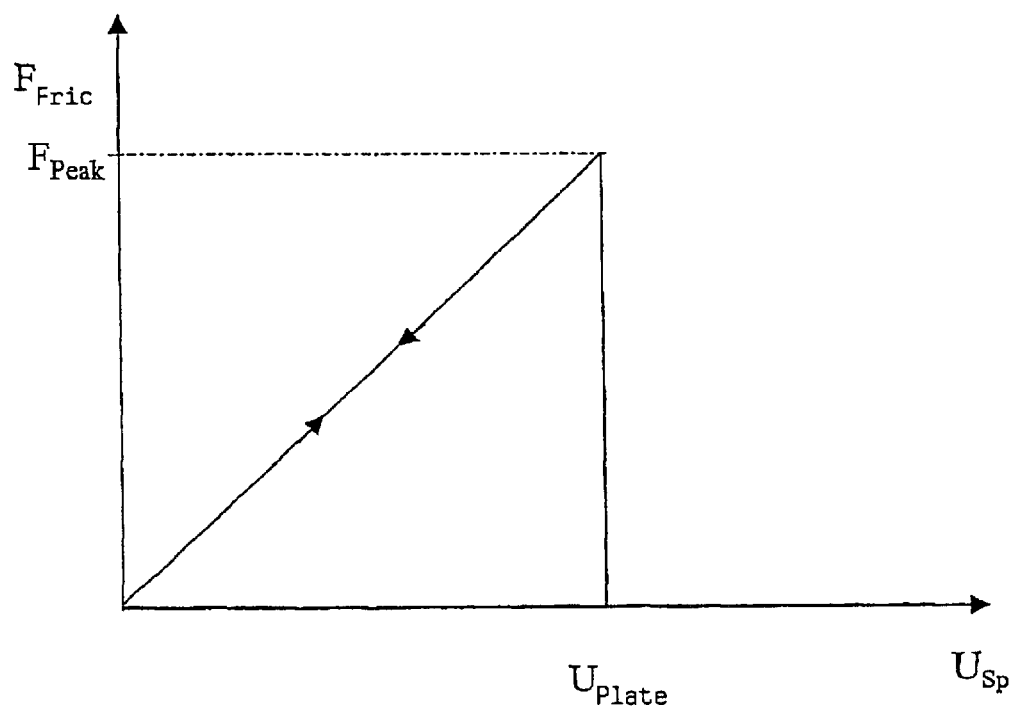

The diagram corresponding to FIG. 7 for this friction brake 27 is shown in FIG. 9. As shown in FIG. 9, the friction force $F_{fric}$ is proportional to the voltage applied to the coil 30.

The operation of this second embodiment of the invention of a friction brake takes place completely in the same manner as already described in connection with the first embodiment in accordance with FIGS. 3 to 5 with the single difference that the friction forces $F_{fric}$, which are needed for damping or clamping, are not adjusted in accordance with the characteristic line of FIG. 7 as it was discussed in connection with FIG. 6, rather, in accordance with the characteristic line of FIG. 9.

Often, it is desirable to clamp the guide so that the clamping takes place exactly at the zero point of the measuring system 16 of the guide. In order to achieve this, one can proceed in that the guide is first clamped in any desired position. In the next step, measuring forces are generated by the measurement force generator 18 in a pulse-like manner against the direction of deflection and these measuring forces operate in opposition to the deflection direction. In this way, measuring forces result which, in the manner of hammer blows, displace the guide stepwise in the direction of the zero position. As soon as the deflection, which is measured by the measuring system 16, returns to the zero position, the measuring system 16 is clamped in the zero position. In this way, complex adjustment operations can be avoided.

As already mentioned, the probe pin can be clamped also in any desired other position in accordance with the method described.

Furthermore, the clamping can likewise, be used to counter a rebound when contacting a workpiece. In a usual contacting, the probe pin 13 rebounds because of the elastic impact occurring when contacting. A rebounding of this kind can be substantially suppressed when the probe pin is clamped for a short time in its position at the time point of the contacting and the clamping of the probe pin is released again directly after the contacting.

Furthermore, the friction brake can also be used in order to hold the probe pin 13 in its rest position when there are acceleration operations of the probe head by the coordinate measuring apparatus. Because of the inertia of the mass of the probe pin 13, the probe pin tends to be deflected out of its rest position opposite to the acceleration direction during acceleration operations of the probe head. Even though this can be prevented by means of a corresponding counter force by the measuring force generators 18, this can also be alternatively prevented in that a suitable damping is adjusted during acceleration operations or the probe pin is even clamped in the particular direction. The acceleration can, for example, be taken from the travel path data of the control of the coordinate measuring apparatus or via acceleration sensors. Accordingly, this procedure is well suited especially for probe heads without measuring force generators whose measuring force is generated mechanically by means of springs.

For the sake of completeness, it is noted that the adhering force in the clamped state can also be changed by varying the voltage $U_{SP}$. This adhering force must be overcome to deflect the probe pin in the particular coordinate direction from the clamped position. For smaller probe pins, one would superpose a smaller adhering force in order to avoid a breaking of the probe pin in an unwanted collision especially for the manual operation wherein the coordinate measuring apparatus can be moved manually via an actuating lever by the operator of the coordinate measuring apparatus.

Furthermore, the described example is only one embodiment. The electromagnet need not be configured as a plunger magnet. The flux-conducting part could, for example, likewise be limited to a core. Also, the plate 24 need not be round, for example; instead, the plate can also have another shape.

It is understood that the foregoing description is that of the preferred embodiments of the invention and that various changes and modifications may be made thereto without departing from the spirit and scope of the invention as defined in the appended claims.

What is claimed is:

1. A probe head for a coordinate measuring apparatus, the probe head comprising:
 a yielding part which deflects during operation of said probe head;
 a plurality of measuring systems for measuring the deflection of said yielding part in respective directions;
 a damping device for damping maid yielding part in a pregiven direction;
 said damping device including at least one friction brake for generating a friction force between two surfaces to effect said damping of said yielding part in said pregiven direction with said friction force being electrically changeable; and,
 an electronic controller connected to said damping device for adjusting said friction force.

2. The probe head of claim 1, said friction brake including a flag and an electromagnet for electromagnetically drawing said flag to said electromagnet.

3. The probe head of claim 2, wherein said flag is a first flag and said damping device includes a second flag; and, said first and second flags coact electromagnetically with said electromagnet.

4. The probe head of claim 3, wherein at least one of said first and second flags is reinforced in the region of said electromagnet.

5. The probe head of claim 2, said damping device further comprising clamping means for clamping said flag.

6. The probe head of claim 5, wherein said flag has a side facing away from said electromagnet; and, said clamping means comprises a plate disposed on said side of said flag in spaced relationship thereto; a holder; and, said plate is resiliently mounted on said holder so as to permit a displacement relative thereto when said plate is drawn by said electromagnet to clamp said flag therebetween.

7. The probe head of claim 6, wherein said plate has a thickness greater than the thickness of said flag.

8. The probe head of claim 1, said electronic controller including means for adjusting said friction force in proportion to the time-dependent derivative of the measured deflection in a particular direction (x, y, z).

9. The probe head of claim 8, said electronic controller including means for clamping said probe head for a short time to counter a rebound of the probe head during a contacting operation.

10. The probe head of claim 1, said friction brake including a flag and an electromagnet coacting with said flag; and, said electronic controller including means for applying an alternating current to said electromagnet for generating a low damping.

11. The probe head of claim 1, said friction brake including a flag; an electromagnet coacting with said flag; and, a spring-suspended plate in spaced relationship to said flag; said electronic controller including means for clamping said friction brake by first applying a voltage ($U_{SP}$) above a threshold voltage ($U_{plate}$) so that said spring-suspended plate is pulled toward said electromagnet and then dropping said voltage ($U_{SP}$) to below said threshold voltage ($U_{plate}$) after said spring-suspended plate has been pulled toward said electromagnet.

12. The probe head of claim 1, further comprising a measuring force generator drivable by said electronic controller; and, for clamping said yielding part in a pregiven desired position of a corresponding one of said measuring systems, said electronic controller functioning to clamp said friction brake in a desired position of said yielding part; and, causing said measuring force generator to generate pulse-like measurement forces opposite to the direction of the deflection relative to said desired position until said corresponding one of maid measuring systems is in its zero position.

13. The probe head of claim 1, wherein said electronic controller increases the friction force of said friction brake or clamps said friction brake during acceleration operations of said probe head.

14. A probe head for a coordinate measuring apparatus, the probe head comprising:
 a yielding part which deflects during operation of said probe head;
 a plurality of measuring systems for measuring the deflection of said yielding part in respective directions;
 a damping device for damping said yielding part in a pregiven direction;
 said damping device including a friction brake for generating a friction force to effect said damping with said friction force in said pregiven direction;
 said friction brake including a flag connected to said yielding part and an electromagnet for electromagnetically drawing said flag into contact engagement with said electromagnet to generate said friction force therebetween to dampen said yielding part; and,
 an electronic controller connected to said electromagnet for adjusting said friction force.

\* \* \* \* \*

UNITED STATES PATENT AND TRADEMARK OFFICE
CERTIFICATE OF CORRECTION

PATENT NO. : 6,922,905 B2
DATED : August 2, 2005
INVENTOR(S) : Franz Szenger et al.

It is certified that error appears in the above-identified patent and that said Letters Patent is hereby corrected as shown below:

Column 5,
Line 18, delete "system" and insert -- systems -- therefor.
Line 21, delete "direction" and insert -- directions -- therefor.

Column 8,
Line 19, delete "likewise," and substitute -- likewise -- therefor.

Column 9,
Line 8, delete "maid" and insert -- said -- therefor.

Column 10,
Line 22, delete "maid" and insert -- said -- therefor.

Signed and Sealed this

First Day of November, 2005

JON W. DUDAS
*Director of the United States Patent and Trademark Office*